Patented Jan. 5, 1932

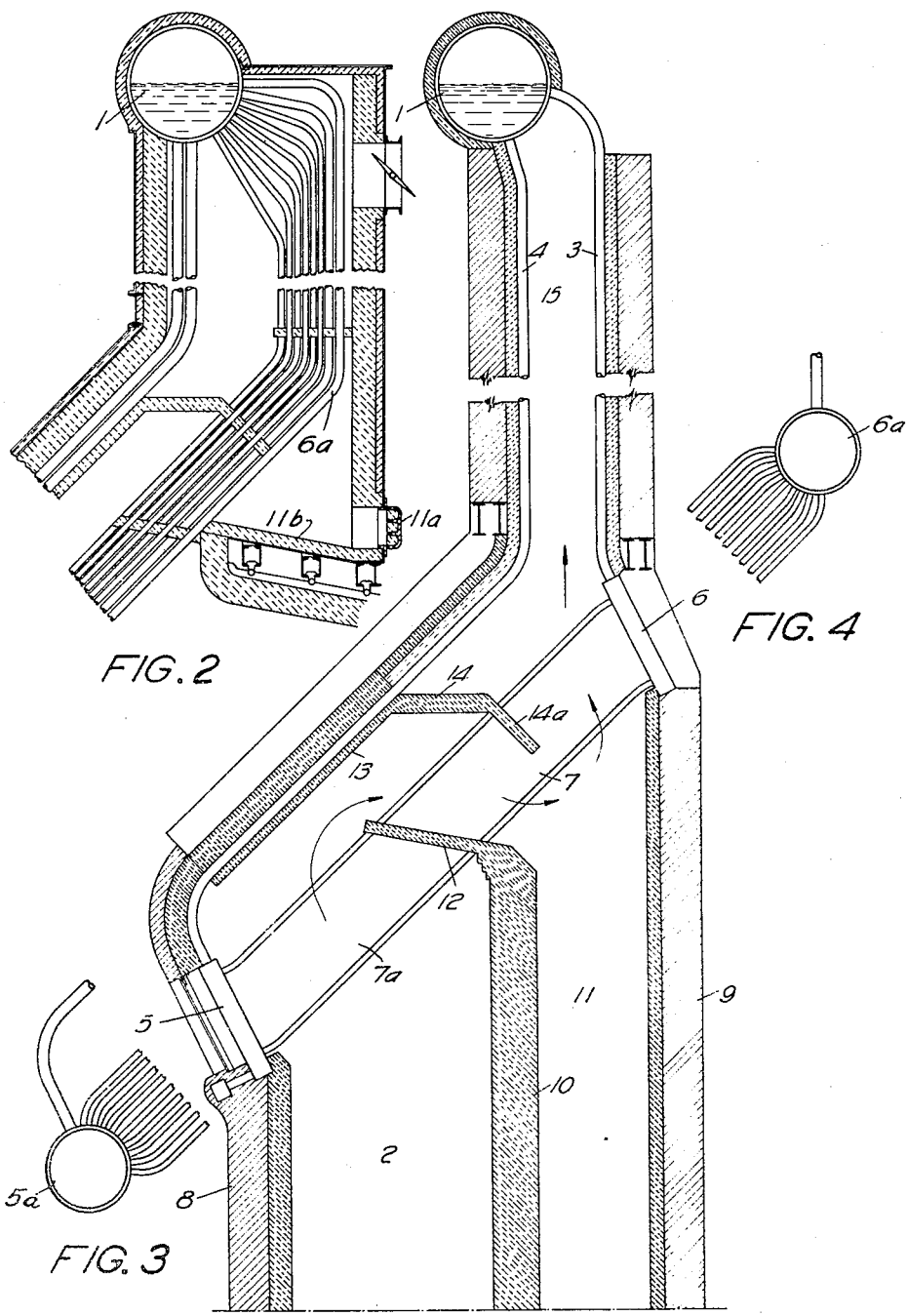

1,839,911

UNITED STATES PATENT OFFICE

JOHN F. L. BAKER, OF SAGINAW, MICHIGAN, ASSIGNOR TO WICKES BOILER CO., OF SAGINAW, MICHIGAN, A CORPORATION OF MICHIGAN

BOILER

Application filed January 16, 1928. Serial No. 247,057.

This invention is a boiler which is especially well adapted for evaporating at high pressure.

Experience with liquids of decomposable character in boilers for power generation has demonstrated that best results can not be attained if the hot liquid is permitted to form large bubbles in the lower drum or in the lower banks of tubes. Therefore, the liquid in circulating up into the gas liberating chamber should carry with it bubbles that are as small as possible.

The upper drum, liberating drum, or vapor-disengaging container, as it is variously termed, is, therefore, preferably located high above the furnace, the hydrostatic pressure of the tall columns of liquid in the riser tubes being availed of to hinder formation of large bubbles in the lower zones of the boiler.

Although intense heating of the lower parts of the tubes that are connected with the bottom header or drum occurs in the normal operation of the boiler, yet the lower drum itself is shielded from direct impingement of furnace heat. In my invention means is also provided for preventing heat losses by radiation from the liquid while on its way from the lower drum to the upper drum.

Within the furnace is a novel arrangement of the tubes and headers or drums that comprise what I shall term the tubular heat-absorbing unit whereby rapid upward circulation of the liquid is attained in that intensely heated zone. During the time the liquid is being circulated through the intensely heated zone formation of large bubbles is minimized on account of the rapidity of circulation induced by the great height of the riser tubes.

There is also a novel means for compelling the most intensely heated gas to encounter and follow closely around those tubular heat-absorbing surfaces which are closest to the bottom drum or header.

The invention also includes a furnace structure of new design and mode of operation characterized by a combustion chamber capable, as previously stated, of being intensely heated. One or more successive heat absorption chambers or passes are traversed by the hot gases on their way from the combustion chamber into the base of a tall stack-like flue that contains the riser tubes on one side and downcomer tubes on their other side.

The furnace structure embodies another novel feature which consists in a flue arrangement whereby the products of combustion, immediately upon leaving the combustion chamber, are directionally changed through a considerable angle upon leaving the combustion chamber. This change in direction takes place directly above the combustion chamber. Here most of the large particles of dust are extracted by separator action and collected in a dust chamber, the gases passing up the flue practically freed from dust.

I also provide a novel arrangement of the riser tubes that carry the highly heated liquid during its long upward travel from the lower heat-absorbing unit to the upper liberating drum. The outstanding feature of this part of the setting is the tall stack-like flue or extension already mentioned that discharges the products of combustion into the chimney, or into a mechanical exhauster, as the case may be.

The riser tubes are enclosed within this tall upright hot gas flue for the purpose of preventing radiation losses from the hot liquid in the tubes. The downcomer tubes are likewise housed in this same flue for the same reason.

This upright flue above the combustion chamber is an important feature of my invention, for the furnace gases rising in this stack-like flue, being at a temperature of one thousand degrees or thereabouts, effectually prevents radiation losses from the risers and downcomers.

Fig. 1 is a vertical section through a boiler setting, showing the boiler with its furnace and flue.

Fig. 2 is a vertical section through the upper part of a boiler setting, showing the flue constructed according to a modified form of my invention.

Figs. 3 and 4 are respectively detail views showing how drums may be used instead of the headers illustrated in Fig. 1.

In the drawings numeral 1 designates the liberating drum which is high above the furnace 2, say, twenty or thirty feet. Numeral 3 designates the riser tubes and 4 the downcomers. 5 is the bottom header, 5a being the modified bottom drum, and 6 the top header, 6a of Fig. 4 showing a drum-shaped top header.

Headers 5 and 6 in the form illustrated in Fig. 1, are connected by a bank of tubes 7 that together comprise what I term the lower heat-absorbing unit. This bank of tubes extends from the header 5 in the front wall 8 through the upper part of furnace 2, being inclined rearwardly and upwardly at an angle of about forty five degrees and extending to the top header 6, which is located in the rear wall 9 of the boiler setting.

Between the back wall 10 of the furnace 2 and the rear wall 9 of the boiler setting is an upright dust chamber 11, the purpose of which has already been stated.

In operation the most intensely heated gases from furnace 2 are compelled to encounter and flow closely around the heat-absorbing surfaces of tube bank 7 that are closest to the bottom header 5, as shown at 7a. This is done by means of the forwardly projecting substantially horizontal roof 12 of furnace 2. The bank of tubes 7 extends upward through this roof, as shown.

The gases, having traveled through pass 7a impinge upon an inner fire-brick lining 13 of the front furnace wall, are deflected toward the back of the setting by a rearwardly projecting baffle 14 with a downwardly extending lip 14a and are thence delivered downwardly into the upper part of the upright dust chamber 11. Beyond the lip 14a the direction of the gas is changed to upward flow through a tall upright flue 15 in which the riser tubes 3 and the downcomers 4 are located. When the gases change their direction at the lip 14a near the top of the dust chamber 11 all the heaviest particles drop out and are collected in the bottom of the chamber.

It is now evident that gases from the intensely hot combustion chamber 2, after heating the lower end 7a of the tube bank 7, are made to travel one or more times crosswise through the bank. The baffles 12 and 14 define a heat absorption chamber and the baffle 14 and header 6 define between them still another such chamber. Thus the lower part of the upwardly inclined tube bank 7 is intensely heated and the upper parts of the bank are used for further heat absorption after the gas has left the combustion chamber.

By locating the risers 3 and downcomers 4 within the tall upright flue 15 there is no radiation loss. The temperature within furnace 2, that is, the intensity of the initial heat imparted to the lower end 7a of the tube bank, is approximately twenty two hundred to twenty five hundred degrees Fahrenheit. The direction of the flow of the hot liquid being naturally upward its circulation is improved by arranging the risers 3 practically as a vertical upward continuation of the tube banks 7, thereby requiring no radical change in the direction of the flow of the hot liquid through the furnace and up the flue. Consequently the liquid circulation is free and very rapid. The liquid level in the boiler is maintained so that the upper drum 1 is about half full. Consequently the complete benefit of the hydrostatic head due to a column of liquid approximately thirty feet in height is available to prevent formation of large bubbles in the heating surfaces that are in the lowest and hottest zone at 7a. The upper part of the front wall of the boiler setting is preferably inclined parallel to the tube bank 7, and its under side in the furnace is faced with fire-brick, as at 13, to shield the downcomers 4 from direct action of the intense initial heat.

The arrangement of the headers 5 and 6 respectively in the lower front wall and upper back wall of the setting as exemplified in Fig. 1 enables the headers and the bank of tubes to be adequately supported and easily accessible.

Referring to Fig. 2, the same results are secured by somewhat different structure, although the novel combination of claimed features is present in both.

In the structure of Fig. 2 the header 6 is omitted and the required rapid and uninterrupted upward circulation from the inclined bank of generating tubes, up through the vertical riser or circulation-inducing tubes, is maintained by substituting for header 6 the tube-bends 6a. Also in the structure of Fig. 2 the dust pit 11 is omitted and a clean-out door 11a and apron 11b of fire-brick is employed. In either structure the lower header 5 may be replaced if desired by a drum, as shown in Fig. 3; also, in the structure of Fig. 1 the upper header 6 may be replaced by a drum 6a, as illustrated in Fig. 4.

Having thus described my invention, what I claim and desire to secure by Letters Patent is:

1. Furnace setting including between its front and rear walls an upright wall dividing the setting into a furnace compartment and a dust chamber, a forwardly projecting substantially horizontal partition constituting a roof for said furnace compartment, the upper part of the front wall of the setting being inwardly and rearwardly inclined, a rearwardly projecting baffle connected to said rearwardly inclined front wall above said partition, a tall upright flue rising from the setting, a vapor liberating drum at the top thereof, a bottom header positioned in the front wall of said setting, a top header in the rear wall of the setting, a tube bank inclined rearwardly and upwardly from the front header to the top header and passing angularly through said furnace roof and through said rearwardly projecting baffle, downcomer tubes connecting the liberating drum and the bottom header and extending downwardly along the inner face of the front wall of the flue and the inner face of the said inclined front wall, riser tubes connecting the top header and said liberating drum and extending upwardly along the inner face of a wall of said flue, for the purposes set forth.

2. Furnace setting including between its front and rear walls an upright wall dividing the setting into a furnace compartment and a dust chamber, a forwardly projecting substantially horizontal partition comprising a roof of said furnace compartment, the upper part of the front wall of the setting being upwardly and rearwardly inclined, a rearwardly projecting baffle connected to said rearwardly inclined front wall above said partition, a tall upright flue rising from the setting, a vapor liberating drum carried by a wall of said flue at the top thereof, a bottom header positioned in the upright front wall of said setting, downcomer tubes connecting the liberating drum and the bottom header and extending downwardly along the inner face of the front wall of the flue and along the inner face of the said inclined front wall, a bank of riser tubes extending rearwardly and upwardly from the front header through said furnace roof and said rearwardly projecting baffle, and connected with said liberating drum, for the purposes set forth.

In testimony whereof, I affix my signature.

JOHN F. L. BAKER.